(12) United States Patent
Ikami

(10) Patent No.: US 6,399,013 B1
(45) Date of Patent: Jun. 4, 2002

(54) METHOD OF MANUFACTURING LARGE-SCALE CERAMICS BOARD

(75) Inventor: Hideo Ikami, Tochigi-prefecture (JP)

(73) Assignee: Nihon-Ceraboth Co., Ltd. (JP)

( * ) Notice: Subject to any disclaimer, the term of this patent is extended or adjusted under 35 U.S.C. 154(b) by 0 days.

(21) Appl. No.: 09/591,758

(22) Filed: Jun. 12, 2000

(30) Foreign Application Priority Data

Mar. 10, 2000 (JP) ........................................ 2000-065995

(51) Int. Cl.[7] ................................................ H05B 6/00
(52) U.S. Cl. .................... 264/434; 264/638; 264/654
(58) Field of Search ............................... 264/434, 638, 264/654

(56) References Cited

U.S. PATENT DOCUMENTS

| | | | | |
|---|---|---|---|---|
| 3,793,134 A | * | 2/1974 | Hardy et al. | 161/162 |
| 3,941,604 A | * | 3/1976 | Boyce | 106/39.5 |
| 4,271,109 A | * | 6/1981 | Boyce | 264/659 |
| 4,495,118 A | | 1/1985 | Ikami | |
| 5,731,250 A | * | 3/1998 | Reid et al. | 501/106 |

* cited by examiner

Primary Examiner—Christopher A. Fiorilla
(74) Attorney, Agent, or Firm—Baker & McKenzie

(57) ABSTRACT

A method of manufacturing large thin wall ceramics board includes pulverizing and uniformly mixing, in dry content conversion, plasticity clay in an amount of 30–40% by weight, wollastonite having an aspect ratio of more than 10 in an amount of 20–50% by weight, and feldspar and talc in an amount of 10 50% by weight to form a mixture. The mixture is added with a solution having a 16–21% weight of the weight of this mixture. The solution has 10% by weight of a paraffin emulsion. The clay-like composition is extruded with a vacuum kneading machine to form a cylindrical shape. The extruded clay-like composition is made into dough board compact of desired thickness after being partially cut parallel to the cylinder. The dough board compact is heated to approximately 80 degrees Celsius with far infrared radiation. The heated dough board is transported on a heat proof metal mesh belt having temperature of between 80 and 150 degrees Celsius, and then gradually heated and dried at 150 to 350 degrees Celsius to dehydrate the dough board. The dehydrated bough board is baked at 1000–1200 degrees Celsius in roller hearth kiln combustion heating device.

20 Claims, 1 Drawing Sheet

METHOD OF MANUFACTURING LARGE-SCALE CERAMICS BOARD

CROSS-REFERENCE TO RELATED APPLICATIONS

The present application claims benefit of the right of priority of Japanese Application No. 605995 entitled METHOD OF MANUFACTURING LARGE-SCALE CERAMICS BOARD, filed on Mar. 10, 2000.

TECHNICAL FIELD OF THE INVENTION

The present invention relates generally to a method of manufacturing ceramics board and more particularly, to a method of improving production efficiency in manufacturing large-scale ceramics tiles and improving the quality of tiles.

BACKGROUND OF THE INVENTION

One conventional method of producing tiles uses a small tile roughly divided into about twenty ceramics pottery tiles and a plastic tile. The small tile forms a fragment of a thin board for attaching on the wall. In Japan, it is usually called pottery product. In this method, the raw material is molded in small rectangles of 10×10 cm or 5×15 cm, and then the baked, for example, by the tunnel kiln.

Another conventional method uses comparatively recent technology of utilizing a large-scale ceramics tile, for example, covering an area of more than 1×1 m. To manufacture the large-scale ceramics, a wet method process and roller press manufacturing methods have been used. Other methods, for example, described in U.S. Pat. No. 4,495,118, have the particle of the raw material in the line distribution in one direction to manufacture products of strong bend strength.

U.S. Pat. No. 4,495,118 describes a large scale ceramics board of a thin board, the size of which is about 30×30 cm, with about 20 mm or less thickness. The manufacturing method utilizes 15% moisture of the crushed raw material clay, feldspar, and the silica. The mixture is combined with kneading machine (pug mill) and are lined in one direction for distribution. As an extruder with curved, round or spiral exit brings rolled raw material clay, the clay is shaped to plate by partly cutting straight in the direction of axis. Next, with the roller type making arranged machine, thickness is evened and when molded again, it becomes like the board for an internal warp to be removed. Next, it is baked with the roller hearth kiln to obtain the product of large-scale ceramics board.

The method described, however, consumes a great deal of time and expense for constructing, producing uneconomical results. Moreover, the method described does not prevent the hygroscopic moisture such as the arrow-lined rain water which infiltrates easily in the building. Further, although extruder aligns crystal grain in raw clay in one direction, selection of raw material based on the shape of crystal grain is insufficient, and the bend strength of the product achieved by this method is still not enough. Therefore, because the size of 30×30 cm is considered as mid-sized for a large-scale thin board and because the thickness is 20–8 mm, it can be said that there still is a problem in the manufacturing method for large-scale thin boards which need improvement.

Further, the prior art rolling rollers have edges at both ends that are opened. When clay like cloth is expanded in a length-wise direction, unevenness in the orientation and density distribution occurs because the edges are open at the ends. Therefore, it is also highly desirable to have a rolling roller that reduces the tendency to cause unevenness in the product.

SUMMARY OF THE INVENTION

The present invention overcomes the shortcomings of the prior art and the difficulty associated with manufacturing large-scale sized ceramics tiles used in architectural material. The method of the present invention greatly improves production efficiency and plane degree during the manufacturing process. The ceramics tiles manufactured with the method of the present invention minimizes hygroscopic properties as to improve the sanitary qualities of the tiles and to reduce surface pollution. The ceramics tiles manufactured with the method of the present invention is made to be fireproof and is not subject to deteriorating from sun rays and harsh weather conditions.

The method of the present invention also improves the prior art methods of manufacturing the large-scale thin board ceramics tile by greatly reducing the tendency to crack easily that is so frequently associated with the large-scale thin boards. Drying raw board containing the argillaceous raw material, especially that of large area is likely to entail crack and transformation, and thus to prevent them, the prior art methods have utilized initial dehydration periods. Initial dehydration periods in the manufacturing method, however, leads to lower productivity.

The method in the present invention of manufacturing large ceramic thin board is an efficient method including a serial production achieved by improvements of the process in which distribution organization of raw material mineral is uniformly aligned. The present invention also provides improvement of existing burners such as the one described in U.S. Pat. No. 4,495,118. In one aspect of the present invention, the plasticity clay in the dry thing conversion 30–40%, wollstonite with needle crystal aspect ratio of more than 10 in an amount of 20–50% by weight, feldspar and/or talc having 10–50% by weight are uniformly crushed and mixed. A solution in an amount of 16–21% weight of this mixture is added to the mixture. The solution contains 10% paraffin emulsion solution. A clay-like composition of matter is extruded cylindrically with a vacuum kneading machine, which then is made into dough board compact of desired thickness after being partially cut parallel to that cylinder. Then the dough is heated to approximately 80 degrees Celsius with far infrared radiation. The dough is then put on heat proof metal mesh belt having temperature of 80 to 150 degrees Celsius. The heat is removed, and the dough is dried and desiccated, then baked at 1000–1200 degrees Celsius in a roller. In one aspect of the method of the present invention, the large-scale thin ceramics board is baked at the temperature of 1000–1200 degrees Celsius with roller hearth kiln combustion heating device.

Accordingly, the method includes pulverizing and uniformly mixing, in dry content conversion, plasticity clay in an amount of 30–40% by weight, wollastonite having an aspect ratio of more than 10 in an amount of 20–50% by weight, and feldspar and talc in an amount of 10–50% by weight to form a mixture; adding to the mixture a solution in an amount of 16–21% by weight of this mixture, the solution containing 10% by weight of paraffin emulsion; extruding clay-like composition to be formed cylindrical with a vacuum kneading machine; making the extruded clay-like composition into dough board compact of desired thickness after being partially cut parallel to that cylinder; heating the dough board compact to approximately 80 degrees Celsius with far infrared radiation, transporting the heated dough board on a heat proof metal mesh belt having temperature between 80 and 350 degrees Celsius; gradually heating and drying the heated dough board at 80 to 150 degrees Celsius to dehydrate the dough board; and baking the dehydrated bough board at 1000–1200 degrees Celsius in roller hearth kiln combustion heating device.

Another aspect of the present invention leaves space the thickness of the desire of the dough board up and down horizontally for the direction where the dough board rolled out progresses by the rolling roller and is composed. The interval of the upper and lower roller is gradually narrowed and at both ends the squeezing inclination is installed, and the width size of the cloth board is prevented from expanding.

Simultaneously, the hollow of the hemisphere of 0.2–0.3 mm is set in discontinuity on the surface of the roller. The method of manufacturing the large-scale thin ceramics board flakes off the roller and the dough board smoothly at the progress movement of the dough board.

Yet another aspect of the present invention include a method of heating the dough board compact. The dough board compact is heated in heating zone having alternately arrangedfar infared radiation body of 15 micrometers wavelength or less and far-infrared radiation body of 16 micrometers wavelength or more. Additionally, the method of manufacturing the large-scale ceramics board of the present invention includes material used for the heat proof metallic mesh belt which has the heat capacity about ten times the board of the cloth for each contact unit area compact. As described herein above, the cloth board compact is transported by the heat proof metallic mesh belt in the heating zone.

Further yet, one aspect of the present invention includes roller hearth kiln combustion heating to give an effect of radiant heat heating. The radiant heat is achieved by the black body heat radiation of the tube burner which in one embodiment comprises silicon carbide and silicon nitride qualities. The radiant heat is also achieved by far-infrared heat radiation. The tube burner has length which is 1.5 to 1.7 times the width of the material to be baked.

DETAILED DESCRIPTION OF THE INVENTION

Figure 1:
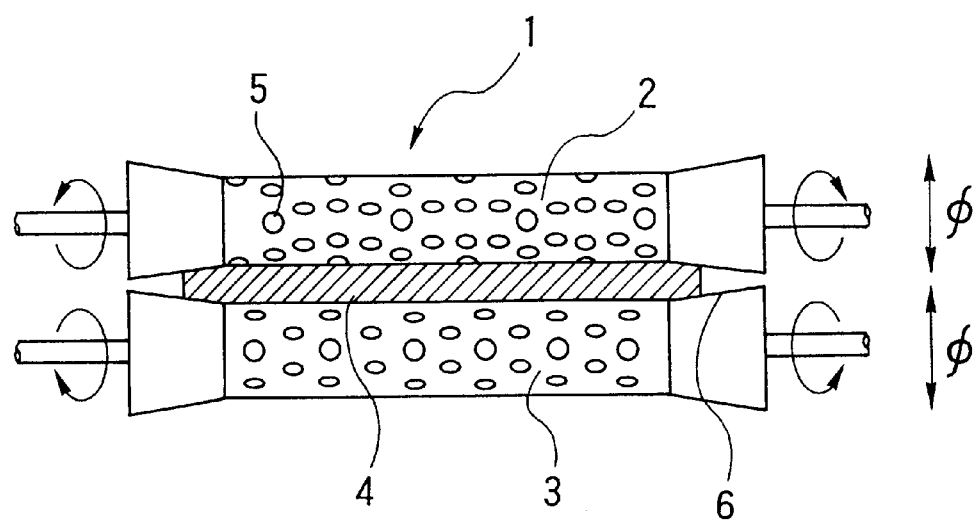
FIG. 1 illustrates front view of a rolling roller in the present invention.

The present invention is directed to a method of manufacturing large thin wall ceramics board. In one aspect, the method includes pulverizing and uniformly mixing, in dry content conversion, plasticity clay in an amount of 30–40% by weight with wollastonite having an aspect ratio of more than 10 in an amount of 20–50% by weight, and/or feldspar and talc in an amount of 10–50% by weight to form a mixture. A solution in an amount of 16–21% by weight of this mixture is added to the mixture. The solution contains 10% by weight of a paraffin emulsion. The method also includes extruding clay-like composition with a vacuum kneading machine to form a cylindrical shape. The extruded clay-like composition is made into dough board compact of desired thickness after being partially cut parallel to that cylinder. The method also includes heating the dough board compact to approximately 80 degrees Celsius with far infrared radiation. The heated dough board is transported on a heat proof metal mesh belt having temperature between 80 and 150 and 350 degrees Celsius. The method includes gradually heating and drying the heated dough board at 80 to 150 degrees Celsius to dehydrate the dough board to desiccate the dough board. The dehydrated dough board is baked at 1000–1200 degrees Celsius in roller hearth kiln combustion heating device.

One novelty of the present invention lies in the selection of the raw material composition and also in the range of the mixing ratio chosen for the raw material. Wollastonite which makes up majority of distribution orientation of mineral crystal is preferably a needle shaped mineral having 10 or more of aspect rate. For example, the elasticity characteristic of the product may not be sufficiently demonstrated if the mixture includes less than 20 percent of wollastonite by weight. On the other hand, if more than 50 percent by weight of wollastonite is present in the mixture, the product may become unsuitable for the sintering condition.

Talc is a lubrication material that distributes, faces and makes the likelihood of orientation condition by extruding. Talc also aids in decreasing resistance of flow in the composition when the mixture is rolled and molded. Feldspars are flux raw materials which acts to decrease the water absorption of the product. The amount of feldspars used in a product may be adjusted according to the quality demanded in the product. The paraffin emulsion added with water aids in improving the distribution characteristic and also facilitates flaking off process when, e.g., water repelling is used with the rolling roller.

Another novelty of the present invention lies in the structure of the rolling roller. That is, the rolling roller of the present invention provides for even orientation and density distribution in the product. The roller of the present invention includes hollow indentations on the surface of the roller so that when the raw material dough and the surface of the roller are pressed to come into contact with one another, air is compressed and sealed inside the hollow. When the roller is released with pressure from the contact, the air in the hollow prevents the raw material from adhering to the roller. In one embodiment, the hollow indentation or dint is shaped like the hemisphere and arranged in discontinuity.

Another novel aspect of the present invention is the system in which far-infrared radiation, for example, $10–10^3$ micrometers, intakes and heats the dough board to a temperature greater than 80 degrees Celsius. A mesh belt having heat proof metal is placed horizontally and heated to about more than 80 degrees Celsius. The dough board is transported to a hot-air drying device where it is dried and dehydrated.

Yet another novel aspect in the present invention includes a heating method used during the manufacturing process to reduce the tendency in the ceramics tiles to crack easily, the quality so frequently associated with the prior art large-scale thin boards. To heat the dough board or the dough board, the present invention utilizes far-infrared radiation, first using radiation having long wavelength of 16 micrometers or more and then using radiation having wavelength of 15 micrometers or less. The far-infrared radiation gives the effect of heating in a short time. For example, it has been confirmed that 4–5 mm raw material board reaches 80 degrees Celsius every 5–10 minutes, and that there was no transformation. Moreover, the mesh belt, which maintains the dough board, conducts heat from the metal wire part which comes in contact with the dough board by using a high thermal conductivity of the metal and discharges steam from the space part. The hot wind which contains moderate hygroscopic moisture in the furnace touches the surface layer and heats the entire product, i.e., dough or dough board, uniformly.

Another novel aspect of the present invention includes a roller hearth kiln combustion heating method. The present invention improves the gas burner of a conventional flame jet type in which temperatures fluctuate in the direction of width of baking an especially wide product. The fluctuation is primarily due to the direct contact with the jetted flames circulating in the furnace. In that method, large heat transmission of 5–1 degrees Celsius per 1 meter was detected.

The method of the present invention, in one aspect, achieves heat transmission by using radiant heat and irradiating heat rays in a line. The present invention includes a novel radiant tube burner having black body comprising silicon carbide or silicon nitride which are far-infrared radiation bodies.

An example of the manufacturing method of large-scale ceramics board will now be described in greater detail herein below. In a dry thing conversion (calculated as the dry weight), usual plasticity clay (40% by weight), wollastonite (45% by weight) containing needle crystal of aspect ratio 10–15, talc (15% by weight) are crushed and mixed. A solution including paraffin emulsion 10% by weight is added in an amount of 17% by weight relative to the mixture so that the entire moisture content is about 15%. Then, the mixture is uniformly mixed so that plasticity raw material composition is prepared. The composition is extruded with the vacuum kneading machine cylindrically, cut open in the direction of axis, and after making thick dough board, undergoes a roller. FIG. 1 is a FIG. illustrating the front view of a roller 1. The interval between upper roller 2 and lower roller 3 may be adjusted to a desired thickness of dough board 4. Moreover, the hollow S of a hemisphere type is irregularly or randomly set on the surface of the upper and lower rollers. The width of the dough board is limited accurately and evenly because both ends of the rolling roller 1 includes squeezing inclination 6 for preventing the dough board from extending sideways. The roller 1 illustrated in FIG. 1 produces, for example, 4 millimeter ("mm") in thickness and 50 dough boards of size 1 meter ("m") corner. As described hereinabove, the dough board does not adhere to the roller and flakes off or detaches completely from the roller 1.

The dough board is then transported to inside a device for far-infrared radiation baking. Application of the short wavelengths far-infrared radiation, e.g., 10 micrometers, and the long wavelength far-infrared radiation, e.g., 20 micrometers, are alternately repeated ten times every 25 seconds causing the temperature to reach 80 degrees Celsius during about eight minutes in total. Eight minutes is a shorter (½ or ⅓) duration than the prior art methods have achieved previously.

Figure 2:
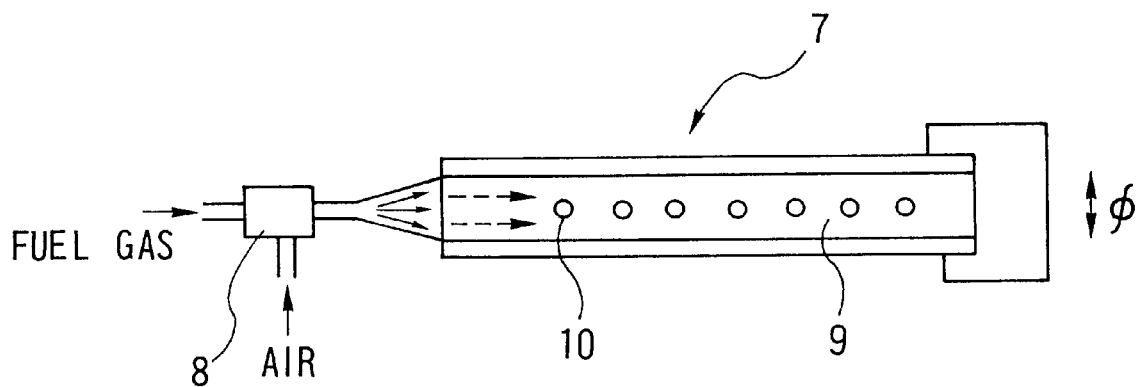
FIG. 2 illustrates front view of radiant tube burner used in the present invention.

Thus a large-scale thin board dough is then baked at 1150 degrees Celsius in a roller hearth kiln. FIG. 2 illustrates the front view the radiant tube burner 7 of the present invention. The radiant tube burner 7 has flame which leaves the gas burner 8 and is made to jet horizontally from flame hole 10 through tube 9 so that flame does not come into contact directly with the thing to be baked, that is, the thin board dough. The finished product produced from using the method of the present invention effectively reduces the defective rate identified in the prior art products.

As appreciated from the above, the novel aspects of the present invention include technical and structural conditions of the rolling molding, the drying and the baking process. The mixing ratio also provides an important novel feature in the present invention and may vary according to the quality demanded in the finished product.

The method of the present invention provides the following improvements in the finished product as well as the manufacturing process.

1) 1.6 times greater productivity of the product with a defective rate lowered by about 50% to demonstrate enormous reduction in costs is demonstrated.

2) As a special effect in raw material compound, improvement of needle shape crystal mineral versus wollastonite distribution organization rate further improves fragility which has been one disadvantage of ceramics products. That is, using the method of the present invention, remarkable effect of the improvement in respect of modulus of elasticity was confirmed. Modulus of elasticity of ceramics produced using the method of the present invention is $3.5-3.7 \times 10^{-5} pgf/cm^2$ as compared to the prior art method which produced elasticity of $10 \times 10^{-5} pgf/cm^2$.

3) The use of the far-infrared radiation greatly shortens the amount of time required for the drying process and at the same time improves the production efficiency of the baking process.

While the invention has been particularly shown and described with respect to a preferred embodiment thereof, it will be understood by those skilled in the art that the foregoing and other changes in form and details may be made therein without departing from the spirit and scope of the invention.

What is claimed is:

1. A method of manufacturing large thin wall ceramics board, comprising:

mixing plasticity clay in an amount of 30–40% by weight, wollastonite having an aspect ratio of not less than 10 in an amount of 20–50% by weight, and at least one of feldspar and talc in an amount of 10–50% by weight to form a mixture;

adding to the mixture a solution in an amount of 16–21% by weight of the mixture, the solution including 10% by weight of a paraffin emulsion;

extruding clay composition to form a predetermined shape;

making the extruded clay composition into a dough board compact of desired thickness;

heating the dough board compact;

drying the heated dough board compact to dehydrate the dough board compact; and baking the dehydrated dough board compact.

2. The method of manufacturing large thin wall ceramics board as claimed in claim 1, wherein the step of extruding includes extruding the mixture to form a cylindrical shape.

3. The method of manufacturing large thin wall ceramics board as claimed in claim 2, wherein the step of extruding includes extruding the mixture to form a cylindrical shape with a vacuum kneading machine.

4. The method of manufacturing large thin wall ceramics board as claimed in claim 2, the method further including cutting the extruded mixture in a direction parallel to the axis of the cylindrical mixture.

5. The method of manufacturing large thin wall ceramics board as claimed in claim 4, wherein the step of making the extruded mixture includes pressing the cut mixture in a plurality of stages each of which includes pressing the cut mixture with a roller device having upper and lower rollers, in which the respective roller devices are aligned.

6. The method of manufacturing large thin wall ceramics board as claimed in claim 5, wherein the plurality of stages include 3 to 5.

7. The method of manufacturing large thin wall ceramics board as claimed in claim 5, wherein the plurality of stages include 4.

8. The method of manufacturing large thin wall ceramics board as claimed in claim 1, wherein the step of heating further includes heating the dough board compact with far infrared radiation.

9. The method of manufacturing large thin wall ceramics board as claimed in claim 1, wherein the step of heating includes heating the dough board compact to 80 degrees Celsius with far infrared radiation.

10. The method of manufacturing large thin wall ceramics board as claimed in claim 1, the method further including transporting the heated dough board compact on a heat proof metal mesh belt prior to the step of drying.

11. The method of manufacturing large thin wall ceramics board as claimed in claim 1, wherein the step of drying further includes gradually heating to dry the heated dough board compact.

12. The method of manufacturing large thin wall ceramics board as claimed in claim 1, wherein the step of drying includes drying the heated dough board compact at a temperature of between 80 and 350 degrees Celsius.

13. The method of manufacturing large thin wall ceramics board as claimed in claim 1, wherein the step of baking includes baking the dehydrated dough board compact at a temperature of between 1000–1200 degrees Celsius.

14. The method of manufacturing large thin wall ceramics board as claimed in claim 1, wherein the step of baking further includes baking in a roller hearth kiln combustion heating device.

15. The method of manufacturing large thin wall ceramics board as claimed in claim 1, wherein the method further includes pulverizing the mixture prior to the step of extruding.

16. The method of manufacturing large thin wall ceramics board as claimed in claim 1, wherein the step of heating the dough board compact includes heating the dough board compact in a heating zone with alternating far-infrared radiation having wavelength of not less than 16 micrometers and far-infrared radiation having wavelength of not greater than 15 micrometers.

17. The method of manufacturing large thin wall ceramics board as claimed in claim 16, wherein the step of heating the dough board compact further includes placing the dough board compact on a mesh belt of heat proof metallic having heat capacity of ten times the dough board compact per unit area at which the dough board compact and the mesh belt contact.

18. The method of manufacturing large ceramics thin wall board as claimed in claim 1, wherein the step of heating the dough board compact includes heating with black body heat radiation.

19. The method of manufacturing large ceramics thin wall board as claimed in claim wherein the black body includes one of silicon carbide and silicon nitride.

20. The method of manufacturing large thin wall ceramics board as claimed in claim 18, wherein heating with black body heat radiation is made by using a tube burner which is disposed extending perpendicular to a direction where the dough board compact is transferred, the tube burner having a length of 1.5 to 1.7 times the width of the dough board compact.

* * * * *